United States Patent
Maasz

(10) Patent No.: US 7,051,716 B2
(45) Date of Patent: May 30, 2006

(54) FUEL TANK

(75) Inventor: Martin Maasz, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 10/825,031

(22) Filed: Apr. 14, 2004

(65) Prior Publication Data

US 2004/0237942 A1    Dec. 2, 2004

(30) Foreign Application Priority Data

Apr. 17, 2003    (DE) ................ 103 18 050

(51) Int. Cl.
*F02M 37/04*    (2006.01)
(52) U.S. Cl. .................... 123/509; 123/516
(58) Field of Classification Search ............ 123/516, 123/509, 514; 137/265, 574, 576, 565.22, 137/565.33
See application file for complete search history.

(56) References Cited

U.S. PATENT DOCUMENTS

| | | | | |
|---|---|---|---|---|
| 3,726,310 A | * | 4/1973 | Coscia | 137/576 |
| 4,763,632 A | * | 8/1988 | Andreasson | 123/510 |
| 5,197,444 A | | 3/1993 | Lang et al. | |
| 5,392,750 A | * | 2/1995 | Laue et al. | 123/509 |
| 5,427,074 A | | 6/1995 | Tuckey | |
| 5,797,376 A | * | 8/1998 | Frank et al. | 123/509 |
| 6,276,342 B1 | * | 8/2001 | Sinz et al. | 123/514 |
| 6,358,412 B1 | * | 3/2002 | Strohl et al. | 210/172 |
| 6,371,153 B1 | * | 4/2002 | Fischerkeller et al. | 137/265 |
| 6,457,459 B1 | | 10/2002 | Schelhas et al. | |
| 6,502,558 B1 | * | 1/2003 | Brunel | 123/509 |
| 6,527,603 B1 | * | 3/2003 | Wickman et al. | 123/509 |

FOREIGN PATENT DOCUMENTS

| | | |
|---|---|---|
| DE | 199 32 356 A1 | 2/2000 |
| DE | 101 33 967 A1 | 2/2003 |
| EP | DE 197 50 036 C2 | 9/1999 |
| EP | 1 302 354 A1 | 4/2003 |
| EP | 0 629 522 A1 | 4/2004 |

* cited by examiner

*Primary Examiner*—Carl S. Miller
(74) *Attorney, Agent, or Firm*—Richard A. Speer; Mayer, Brown, Rowe & Maw LLP

(57) ABSTRACT

In the case of a fuel tank (1) for a motor vehicle having a plurality of surge chambers (6, 6') for collecting fuel, two surge chambers (6, 6') are closed in a manner essentially forming a seal and are connected to each other. Fuel conducted by a pressure regulator (12) and by suction jet pumps (16, 16') into the surge chambers (6, 6') is distributed to the surge chambers (6, 6') as required. When the surge chambers (6, 6') are completely filled, a pressure is produced, as a result of which a further filling by the suction jet pumps (16, 16') is avoided.

8 Claims, 2 Drawing Sheets

FUEL TANK

BACKGROUND OF THE INVENTION

The invention relates to a fuel tank for a motor vehicle having a plurality of surge chambers for collecting fuel, having a plurality of fuel pumps for feeding fuel from the surge chambers to an internal combustion engine of the motor vehicle and for feeding fuel to suction jet pumps arranged in the fuel tank, and having feed lines for the suction jet pumps for feeding fuel into the surge chambers.

Fuel tanks of this type are frequently used in particular for high-power motor vehicles, in which a single feed unit having a surge chamber and a fuel pump can be difficult to arrange in the fuel tank due to its excessive dimensions because of the power values, and are known from practice. In this case, the fuel pumps generally have a preliminary stage for feeding the fuel from the fuel tank directly into the surge chamber and a main stage for feeding the fuel from the surge chamber to the internal combustion engine, and are arranged within the surge chamber. In addition, fuel is frequently returned into the surge chambers by a pressure regulator in the form of a return controlling means. This design has the advantage that the surge chambers are filled in a number of ways.

It is disadvantageous, however, that the suction jet pumps are continuously supplied with fuel by the fuel pumps. This leads to an unnecessary circulation of fuel and therefore to a high permeation of fuel out of the fuel tank. Furthermore, the continuous circulation of the fuel leads to the formation of gas bubbles in the fuel and therefore to an impairment of the fuel feed.

Consideration has already been given to controlling the surge chambers with float valves, so that, if a surge chamber is filled, no more fuel is conducted out of the return into this surge chamber. However, the fuel tank becomes very complex in terms of design and susceptible to faults as a result.

The invention is based on the problem of designing a fuel tank of the type mentioned at the beginning in such a manner that an unnecessary circulation by the suction jet pumps is largely avoided.

BRIEF DESCRIPTION OF THE INVENTION

This problem is solved according to the invention by the surge chambers being closed in a manner essentially forming a seal and by them having means for limiting a maximum pressure.

This design means that the surge chambers have self-regulation, as a result of which a feeding of fuel into the filled surge chamber leads to a rise in the pressure and therefore to a counterpressure on the suction jet pumps. The rise in the pressure in the surge chambers therefore greatly reduces the feeding capacity of the suction jet pumps. The invention thus means that an overflowing of the surge chambers and an unnecessary circulation of the fuel in the fuel tank are avoided. The fuel tank according to the invention does not require float valves, which are of complex construction and are susceptible to faults. The fuel tank is therefore of particularly simple construction in terms of design. A particularly large pressure which is produced by the fuel returned by the internal combustion engine is dissipated via the suction jet pump by the fuel being directed counter to the designated direction of flow of the suction jet pump. The device according to the invention therefore brings about an improvement in the efficiency of the return controlling means.

A preferred filling of one of the surge chambers on account of different flow resistances in the lines is unproblematical for the reliable operation of the fuel pumps.

For example, when the motor vehicle is cornering or traveling uphill, there is the risk of one of the surge chambers running empty, which leads to damage to the fuel pump sucking up fuel from it and, on account of insufficient fuel being supplied to the internal combustion engine, to misfires.

In the case of a return line coming from a pressure regulator, a reliable filling of all of the surge chambers can be ensured in a simple manner if the return line opens into a plurality of surge chambers. The design according to the invention of the fuel tank enables the returned fuel to be conducted into the surge chamber which has the smallest counterpressure. Given this distribution of the fuel, different flow resistances in the lines as a consequence of the self-regulation of the filling of the surge chambers do not result in any impairment.

For example, when the motor vehicle is cornering and the fuel tank is virtually empty, all of the fuel can collect in a single chamber of the fuel tank. However, according to another advantageous development of the invention, a running-empty of the surge chamber arranged in the opposite chamber can be avoided in a simple manner if suction jet pumps and surge chambers respectively arranged in mutually opposite chambers of the fuel tank are connected to one another.

According to another advantageous development of the invention, ventilation and aeration of the surge chambers is achieved via the combined jet lines of the particular suction jet pump.

At the same time, sufficient self-regulation of the feeding capacity of the suction jet pumps and of the filling of the surge chambers is achieved as a result.

A contribution is made to further simplifying the construction in terms of design of the fuel tank according to the invention if the surge chambers have a cup-shaped base part and a cover which closes the opening of the cup-shaped base part.

The fuel tank according to the invention can be fitted in a particularly simple manner if the cover is clipped to the cup-shaped base part.

The cover of the surge chamber can be reliably sealed off from the cup-shaped base part during operation of the fuel tank in a simple manner if the cover and/or the base part is/are manufactured from a material which is capable of swelling with fuel.

According to another advantageous development of the invention, a contribution is made to further improving the sealing of the surge chambers if the cover has a sealing element to seal it off from the base part.

BRIEF DESCRIPTION OF THE DRAWINGS

The invention permits numerous embodiments. To further clarify its basic principle one of these is illustrated in the drawing and is described below. In the drawing

DETAILED DESCRIPTION OF THE INVENTION

Figure 1:
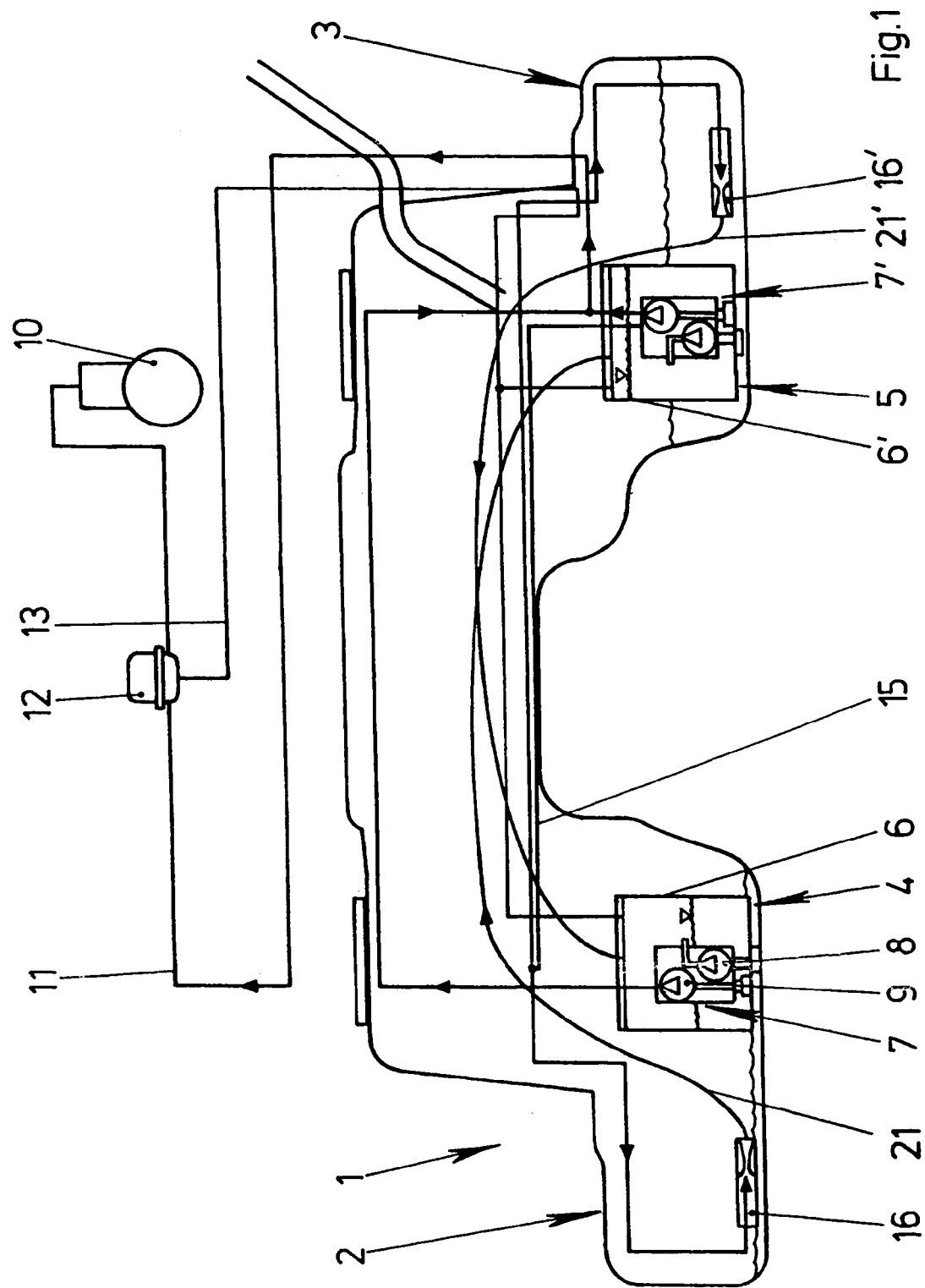
FIG. 1 shows diagrammatically a sectional illustration through a fuel tank according to the invention.

FIG. 1 shows a fuel tank I having two chambers 2, 3 and a respective feed unit 4, 5 arranged in them. The feed units 4, 5 have a respective surge chamber 6, 6' with a two-stage fuel pump 7, 7' arranged in them. The fuel pumps 7, 7' each have a preliminary stage 8, with which fuel is fed from the fuel tank 1 into the particular surge chamber 6, 6', and a main stage 9 for feeding fuel from the surge chamber 6, 6' to an internal combustion engine 10. The preliminary stage 8 may be, for example, a suction jet pump driven by the main stage 9 or an electrically driven pump. A pressure regulator 12 is arranged in a forward-flow line 11 between the fuel pumps 7, 7' and the internal combustion engine 10. When a designated pressure of, for example, 4 bar is exceeded, fuel is returned into the fuel tank 1 via a return line 13. The return line 13 is connected to both surge chambers 6, 6'. One of the fuel pumps 7' is connected to two suction jet pumps 16, 16' via a working fluid line 15. However, it is also conceivable to operate each suction jet pump by one fuel pump in each case. The suction jet pumps 16, 16' are likewise arranged in the chambers 2, 3 and feed fuel via the combined jet lines 21, 21' into the surge chamber 6, 6' of the chamber 2, 3 lying opposite in each case.

Figure 2:
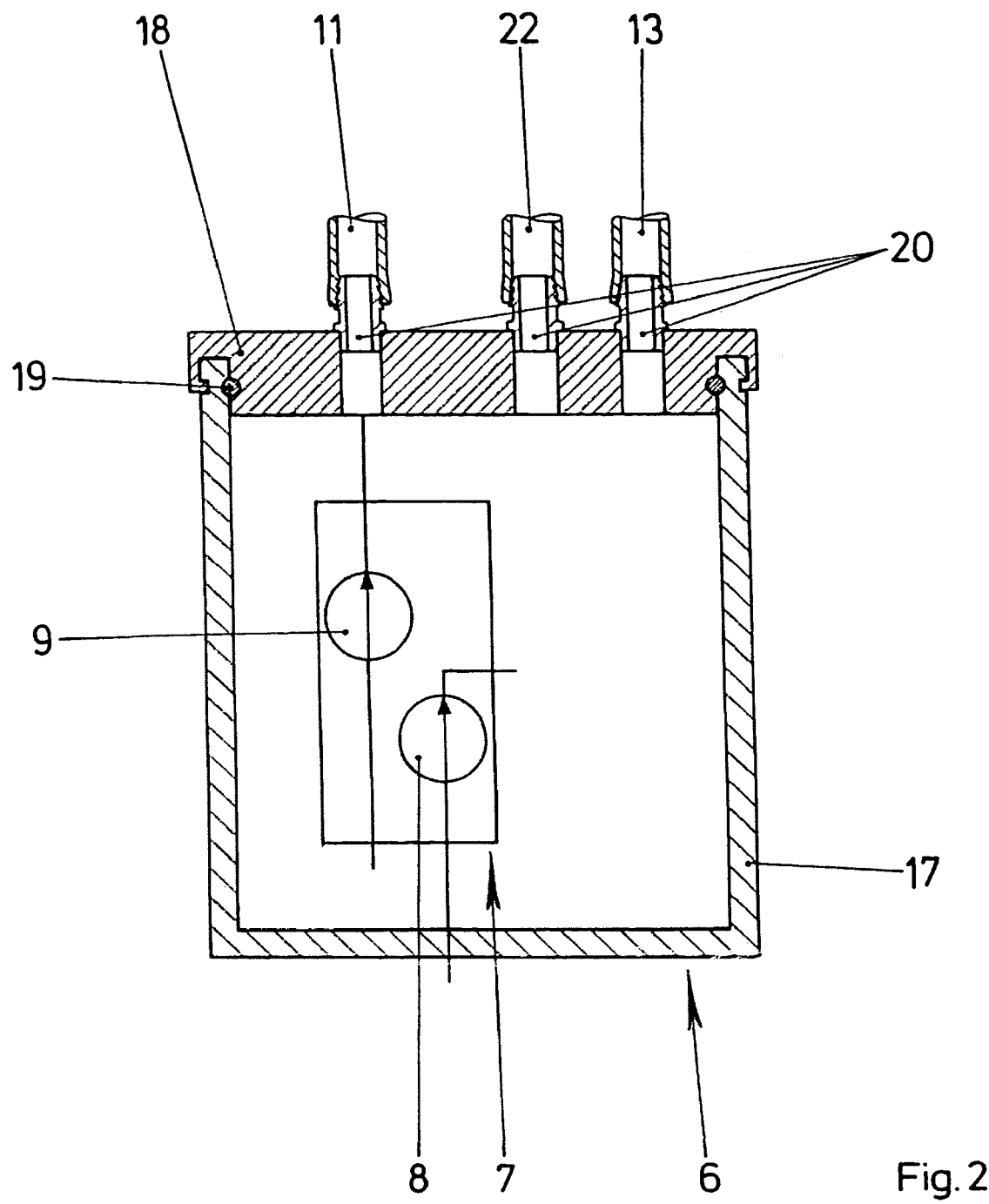
FIG. 2 shows diagrammatically a sectional illustration through a surge chamber of the fuel tank according to the invention from FIG. 1.

FIG. 2 shows diagrammatically a sectional illustration through one of the surge chambers 6 from FIG. 1 with the fuel pump 7 arranged in it. It can be seen here that the surge chamber 6 has a cup-shaped base part 17 and a cover 18 clipped to the base part 17. The cover 18 is sealed off from the base part 17 by means of a sealing element 19. Connections 20 for the forward-flow line, the return line 13 and for a line 22 coming from the suction jet pump 16' are arranged in the cover 18.

What is claimed is:

1. A fuel tank (1) for a motor vehicle having a plurality of surge chambers (6, 6') for collecting fuel, having a plurality of fuel pumps (7, 7') for feeding fuel from the surge chambers to an internal combustion engine of the motor vehicle and for feeding fuel to suction jet pumps (16, 16') arranged in the fuel tank, and having feed lines for the suction jet pumps for feeding fuel into the surge chambers, characterized in that the surge chambers (6, 6') are permanently sealed chambers that regulate the quantities of fuel entering the surge chambers by means of counter pressures which regulate the feed rates of the jet pumps.

2. The fuel tank as defined in claim 1, wherein a return line (13) coming from a pressure regulator opens into a plurality of surge chambers (6, 6').

3. The fuel tank as defined in claim 1, wherein the suction jet pumps (16, 16') and surge chambers (6, 6') respectively arranged in mutually opposite chambers (2, 3) of the fuel tank (1) and are connected to one another.

4. The fuel tank as defined in claim 3, wherein the surge chambers (6, 6') are respectively filled via jet lines (21, 21').

5. The fuel tank as defined in claim 1, wherein the surge chambers (6, 6') have a cup-shaped base part (17) and a cover (18) which closes the opening of the cup-shaped base part (17).

6. The fuel tank as defined in claim 5, wherein the cover (18) is clipped to the cup-shaped base part (17).

7. The fuel tank as defined in claim 5, wherein the cover (18) or the base part (17) is manufactured from a material which is capable of swelling in fuel.

8. The fuel tank as defined in claim 5, 6 or 7, wherein the cover (18) has a sealing element (19) to seal it off from the base part (17).

* * * * *